H. M. BIGWOOD & F. H. TERRY.
PIPE UNION OR COUPLING FOR ELECTRIC CONDUIT JUNCTION BOXES AND OTHER PURPOSES.
APPLICATION FILED NOV. 7, 1912.

1,072,379. Patented Sept. 2, 1913.

WITNESSES
John N. Hoving
Cornelius Hoving

INVENTORS
H. M. Bigwood, F. H. Terry
By F. Van Oldenweel
ATTORNEY

UNITED STATES PATENT OFFICE.

HENRY MALCOLM BIGWOOD AND FREDERICK HERBERT TERRY, OF WOLVERHAMPTON, ENGLAND.

PIPE UNION OR COUPLING FOR ELECTRIC-CONDUIT JUNCTION-BOXES AND OTHER PURPOSES.

1,072,379.

Specification of Letters Patent. Patented Sept. 2, 1913.

Application filed November 7, 1912. Serial No. 730,116.

*To all whom it may concern:*

Be it known that we, HENRY MALCOLM BIGWOOD and FREDERICK HERBERT TERRY, subjects of the King of Great Britain, residing at 23 Albany road, Wolverhampton, and The Nook Penn, Wolverhampton, respectively, in the county of Stafford, England, have invented a new and useful Pipe Union or Coupling for Electric-Conduit Junction-Boxes and other Purposes; and we do hereby declare the following to be a full, clear, and exact description of the same.

Our invention comprises improvements in electric conduit junction boxes and refers to that class of such wherein a longitudinal split loose ring is contracted around the pipe for the purpose of providing a frictional engagement therewith, the object of our said invention being to provide an improved and more efficient fitting of the specified type.

In order that our invention may be clearly understood and more readily carried into practice we have appended hereunto one sheet of drawings illustrating the same wherein:—

Figure 1:
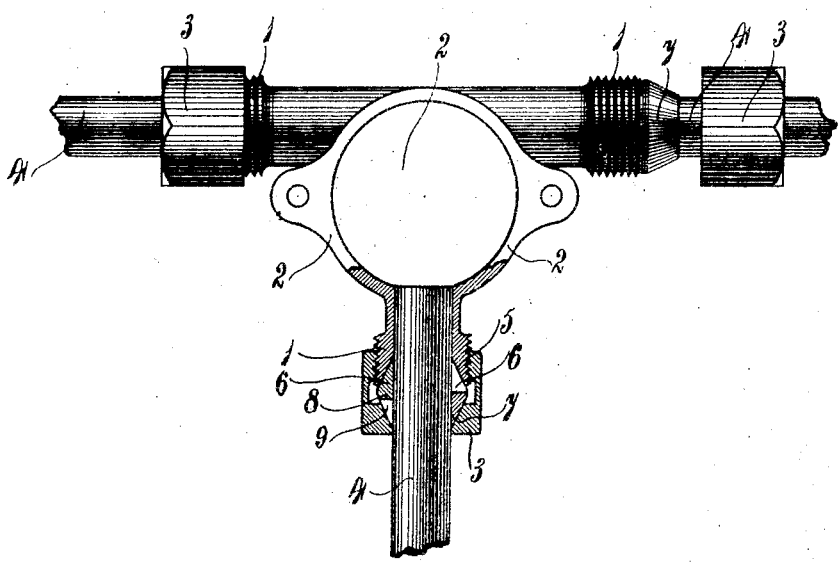
Figure 2:
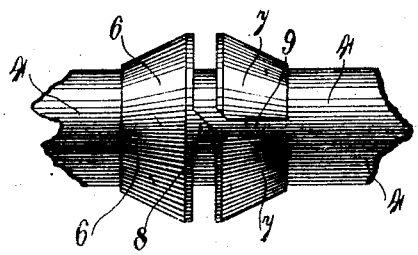

Figure 1. illustrates an electrical conduit junction box to which the conduit pipes are secured according to the present invention, the junction being of the three way type one union being in its assembled position the second union being partly detached while the third union is in section. Fig. 2. illustrates the two tapered split members which are employed to establish frictional engagement with the pipes.

In carrying our invention into practice as illustrated upon the accompanying drawings at Figs. 1 and 2 the socket ends 1 of the junction box 2 are externally screwed to receive the cap nut 3 and internally bored to receive the conduit pipes 4. The mouth of the sockets are bored taper as 5 to receive a correspondingly externally tapered split ring 6 while the nut is similarly bored to receive a similar split ring 7. They are made separate the members 6 being provided with a projection 8 which engages the slot or opening 9 in the other ring to prevent relative rotation, thereby making it impossible for the two slots or openings in the rings to be in alinement and thus making it impossible for water or moisture to enter into the junction box by way of these slots. Or any other suitable means may be employed to prevent relative rotation of the ring.

It will be obvious that when the nut is tightened up the two rings will be gripped between the internally tapered parts of the nut and socket being thus contracted about the pipe with which they will make perfect frictional engagement for owing to their formation and arrangement the bore of the rings will remain parallel when contracted and grip for their full length.

What we claim then is:—

1. In an electric conduit junction box, the combination of a socket member externally screw-threaded and internally tapered; a nut internally screw-threaded to engage the threads of said socket and internally tapered; a pair of loose rings each longitudinally split and externally tapered, one ring fitting within the taper of the socket and the other within the taper of the nut; and means for holding the longitudinal splits of the loose rings out of register with each other for preventing the entry of moisture through the splits into the box.

2. In an electric conduit junction box, the combination of a socket member externally screw-threaded and internally tapered; a nut internally screw-threaded to engage the threads of said socket and internally tapered; a pair of loose rings each longitudinally split and externally tapered, one ring fitting within the taper of the socket and the other within the taper of the nut; and means for preventing relative rotation between the two loose rings.

3. In a pipe union or coupling for electric conduit junction boxes and other purposes, the combination of a socket member externally screw-threaded and internally tapered; a nut internally screw-threaded to engage the threads of said socket and internally tapered; a pair of loose rings each longitudinally split and externally tapered; one ring fitting within the taper of the socket and the other within the taper of the nut; and a projection on one of said rings engaging the split in the other ring.

In testimony whereof, we have signed our names to this specification in the presence of two subscribing witnesses.

HENRY MALCOLM BIGWOOD.
F. HERBERT TERRY.

Witnesses:
HAROLD C. FORRESTER,
NORMAN S. BARLOW.